United States Patent
Eglin

(10) Patent No.: US 8,655,510 B2
(45) Date of Patent: Feb. 18, 2014

(54) METHOD OF REGULATING THE PROPULSIVE SPEED OF A HYBRID HELICOPTER

(71) Applicant: Eurocopter, Cedex (FR)

(72) Inventor: Paul Eglin, Roquefort la Bedoule (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 13/627,338

(22) Filed: Sep. 26, 2012

(65) Prior Publication Data

US 2013/0079956 A1 Mar. 28, 2013

(30) Foreign Application Priority Data

Sep. 27, 2011 (FR) ...................................... 11 02925

(51) Int. Cl.
*G01C 23/00* (2006.01)
(52) U.S. Cl.
USPC .............................................................. 701/3
(58) Field of Classification Search
USPC .............................................................. 701/3
See application file for complete search history.

(56) References Cited

U.S. PATENT DOCUMENTS

| 8,170,728 | B2 | 5/2012 | Roesch | |
|---|---|---|---|---|
| 2008/0294305 | A1* | 11/2008 | Roesch | 701/3 |
| 2010/0310371 | A1* | 12/2010 | Eglin | 416/1 |
| 2010/0312421 | A1 | 12/2010 | Eglin | |

FOREIGN PATENT DOCUMENTS

| EP | 2258615 A1 | 12/2010 |
|---|---|---|
| FR | 2916421 A1 | 11/2008 |
| FR | 2946315 A1 | 12/2010 |

OTHER PUBLICATIONS

Search Report and Written Opinion; Application No. FR 1102925; dated May 23, 2011.

* cited by examiner

*Primary Examiner* — James Trammell
*Assistant Examiner* — Michael D Lang
(74) *Attorney, Agent, or Firm* — Brooks Kushman P.C.

(57) ABSTRACT

A method of regulating the propulsion speed of a hybrid helicopter. In application of a correction process for protecting the hybrid helicopter, piloting orders generated by a manual control member relate to an airspeed setpoint and they are corrected by control means in accordance with at least one correction mode in which the piloting orders are corrected in application of a rule that takes account of a setpoint consumed power corresponding to the airspeed setpoint derived from the piloting order.

13 Claims, 1 Drawing Sheet

METHOD OF REGULATING THE PROPULSIVE SPEED OF A HYBRID HELICOPTER

CROSS REFERENCE TO RELATED APPLICATIONS

This application claims priority to French patent application FR 11/02925 filed on Sep. 27, 2011, the disclosure of which is incorporated in its entirety by reference herein.

FIELD OF THE INVENTION (1) Background Art

The present invention relates to the field of rotorcraft, and more particularly of hybrid helicopters having at least one main rotor that provides lift, and possibly also propulsion, and at least one propulsive propeller. The present invention relates more particularly to automatic means for hybrid helicopters that generate piloting orders to procure at least a function of regulating helicopter propulsion. The present invention provides a control method for regulating the drive of a hybrid helicopter, in particular for the purpose of maintaining propulsion speed.

(2) Description of Related Art

Among rotorcraft, the term "hybrid" helicopter is used to designate an aircraft having at least one main rotor and at least one propulsive propeller. Such a hybrid helicopter has the reputation of being a helicopter that is fast and that has a long range, in which at least one propulsive propeller procures propulsion of the helicopter for movement in translation.

The main rotor is a rotor having an axis that is substantially vertical and that procures lift for the rotorcraft, and possibly also a marginal amount of propulsion. The propulsive propeller is a rotor having a horizontal axis that procures propulsion for the rotorcraft. The respective axes of rotation of the main rotor and of the propulsive propeller are substantially mutually orthogonal. The vertical and horizontal directions should be considered relative to the general orientation of the rotorcraft. A hybrid helicopter may have a single propulsive propeller or it may be provided with a plurality of propulsive propellers that are distributed laterally on either side of the hybrid helicopter.

The main rotor and the propulsive propeller each comprise a respective set of blades driven in rotation by a power plant, in particular a turbine engine. It is usual for the power plant to be common to driving rotation of the main rotor and of the propulsive propeller. The power plant drives rotation of the main rotor on a priority basis, with the remainder of the power delivered by the power plant constituting power that is available for driving rotation of the propulsive propeller. It is also possible to envisage allocating respective power plants to the main rotor and to the propulsive propeller, but such a solution is not desirable because of the resulting increase in the weight of the hybrid helicopter, nevertheless the method of the present invention may be applied thereto.

There is a problem in regulating the propulsion speed of a hybrid helicopter. This problem is explained more particularly in document FR 2 946 315 (Eurocopter), there being difficulties to be overcome in controlling the use of a propulsive propeller forming part of a hybrid helicopter.

In order to vary the propulsion speed of a hybrid helicopter, the mean pitch of the blades of the propulsive propeller is varied under the control of automatic control means that are operated from a control member. The control member is a manual control member that is operated in particular by a human, e.g. being placed on a control member commonly referred to by the person skilled in the art as a "beep trim" button. The control member serves in particular to issue a thrust variation setpoint. The term "manual" should be understood as being in contrast to an automatic control member. The pilot of a hybrid helicopter uses the manual control member to issue piloting orders relating to the desired level of thrust that is to be supplied by the propulsive propeller. The control means are calculation means that generate a mean pitch setpoint for the blades of the propulsive propeller on the basis of the piloting orders as issued and that generate control orders corresponding to said setpoint for regulating the pitch of the blades of the propulsive propeller. Regulation of the pitch of the blades of the propulsive propeller must take account of various constraints concerning the operation of the hybrid helicopter, in particular constraints associated with ensuring that it operates safely.

For example, the control means must be capable of accommodating a piloting order that might be given in untimely manner or a pitch variation control that is issued deliberately by the pilot but that is excessive. As another example, in the event of a hybrid helicopter losing speed, as happens when taking a nose-up attitude, the aerodynamic angle of attack of the blades increases in the absence of blade pitch being corrected by the pilot. An increase in the angle of attack of the blades gives rise to an increase in the amount of power consumed by the propulsive propeller, and that can run the risk of exceeding the capacity of the power plant used for driving it in rotation.

Account must also be taken of the strength capacity of the hybrid helicopter when faced with a propulsion flight control request that is excessive and that could damage it. Such strength capacity needs to be taken into consideration not only with respect to the nominal strength and power of the power plant used for driving the propulsive propeller, but also with respect to all of the members that make up the drive train connecting the power plant to the propulsive propeller.

In order to protect a hybrid helicopter, document FR 2 946 315 proposes various control modes in which the propulsive propeller can be used, serving to adjust the pitch of the blades depending on the travel speed of the hybrid helicopter. Such adjustment serves to avoid any divergence between the power required by the propulsive propeller and the strength capacity of the hybrid helicopter with respect to such a power requirement. More particularly, document FR 2 946 315 proposes regulating the operation of the propulsive propeller on the basis of the following operating modes for the control means:

a direct mode in which the value for the mean pitch of the blades of the propulsive propeller is generated by the control means directly from a piloting order relating to varying thrust. The control order corresponds to a mean pitch setpoint for the blades that is generated by the control means directly on the basis of a piloting order so as to increase the propulsion speed delivered by the propulsive propeller;

a forced mode that is used as from the main rotor being put into auto-rotation. In forced mode, the control order is derived from a value calculated by the control means and it corresponds to a mean pitch setpoint for the blades, which setpoint is forced on request issued by the pilot using the manual control member;

a regulated mode in which the power being consumed by the propulsive propeller is regulated by the control means. In regulated mode, the control means generate control orders as a function of a power setpoint that is derived from a piloting order relating to a thrust variation. The piloting order is issued by the pilot using the manual control member, and it is processed by the control means in order to regulate the power that is consumed by the propulsive propeller; and a protected mode that is used in each of the other modes, except forced mode. In protected mode, control orders generated by the control means are subjected to safety conditions. The mean pitch setpoints for the blades are worked out by the control means on the basis of a piloting order that may be issued equally well in direct mode or in regulated mode, providing that determined limit parameters for the power consumed by the propulsive propeller have reached or exceeded an acceptable limit.

The protected mode is used spontaneously by the control means in order to protect the hybrid helicopter from possible damage, and more particularly, in order to preserve the power plant and/or the various members making up the drive train connecting the power plant to the propulsive propeller. On the basis of a piloting order issued by the pilot by means of the manual control member, the control means automatically generate a control order relating to a mean pitch setpoint that is established in application of determined parameters relating to the strength capacity of the hybrid helicopter. In protected mode, the control means automatically reduce appropriately the mean pitch setpoint for the blade as previously determined on the basis of the piloting order relating to a request to vary thrust as issued in direct mode, and/or relating to a power setpoint as issued by the control means in regulated mode.

Consequently, two processes for piloting a hybrid helicopter in propulsion can be distinguished as a function of the ways in which the control means intervene. Whatever the process that is being used, the amount of power being consumed is monitored continuously by rules for protecting the operation of the hybrid helicopter so as to enable the control means to intervene in application of one and/or the other of the operating modes.

In a piloted process, the mean pitch setpoint for the blades of the propulsive propeller is worked out on the basis of a piloting order issued directly by the human pilot operating the manual control member. The piloted process makes it possible, on the basis of a flight control operated by the pilot, to cause the pitch of the blades of the propulsive propeller to vary at a constant rate in order to control accelerations of the hybrid helicopter.

In a corrective process for protecting the hybrid helicopter, the mean pitch setpoint for the blades of the propulsive propeller is worked out by the control means on the basis of a piloting order that is issued by the human pilot operating the manual control member and that is automatically corrected by the control means as a function of the power being consumed by the propulsive propeller. Control orders are spontaneously adapted as a function of constraints associated with protected operation of the hybrid helicopter. The corrective process is used so that at low consumed power the pitch of the blades of the propulsive propeller remains fixed, while at high consumed power the pitch of the blades of the propulsive propeller is managed on the basis of a control relationship that tends to keep constant the amount of power that is being consumed.

It has been found that such provisions can be improved. In particular, the forward speed of a hybrid helicopter is managed by the control means independently of any variation in the pitching attitude of the hybrid helicopter. One possible solution would be regulation between the speed and the pitch of the blades of the propulsive propeller, but that gives rise to an operating safety constraint for the hybrid helicopter. In particular, such a solution for regulation runs the risk of exceeding the acceptable limit on power from the power plant driving the propulsive propeller.

According to document FR 2 946 315, speed is maintained by increasing the pitch of the blades of the propulsive propeller. In this context, care should be taken to ensure that any improvement in the way in which the control means operate takes account of the need to avoid any risk of damaging the hybrid helicopter or causing it to malfunction. More particularly, care should be taken to ensure that a piloting order relating to varying the pitch of the blades or relating to the thrust to be exerted by the propulsive propeller does not give rise to a risk of exceeding a maximum authorized airspeed or of exceeding operating safety limits for the hybrid helicopter.

BRIEF SUMMARY OF THE INVENTION

The object of the present invention is to propose a control method that provides regulation for maintaining the propulsive speed of a hybrid helicopter. Such a control method seeks in particular to improve the interface between the human pilot and the control means, in particular with respect to safe flying conditions for the hybrid helicopter.

The present invention seeks more particularly to improve the control system constituting the subject matter of document FR 2 946 315, which is incorporated by reference herein in order to improve the ergonomics for the pilot of the control means for maintaining propulsion speed in this way. This improvement is sought without losing sight of the need to avoid any risk of damaging the hybrid helicopter.

Provisions are sought in particular that are suitable for maintaining the propulsion speed within the context of constraints associated with the operating safety of a hybrid helicopter as explained in document FR 2 946 315. The looked-for improvement seeks more specifically to ensure that the piloting assistance provided by the control means is improved in terms of propelling a hybrid helicopter under good safety conditions.

The control method of the present invention is a method of regulating the propulsion speed of a hybrid helicopter. A hybrid helicopter is a rotorcraft having at least one main rotor for providing lift and possibly also propulsion, and at least one propulsive propeller having a set of variable-pitch blades. The number of propulsive propellers included in the hybrid helicopter is indifferent, but the control method of the present invention is particularly suitable for a hybrid helicopter having a plurality of propulsive propellers, and in particular a pair of propulsive propellers distributed laterally on either side of the hybrid helicopter. The main rotor and the propulsive propeller(s) are driven independently in rotation by at least one power plant of the hybrid helicopter. The power plant is preferably common for driving both the main rotor and the propulsive propeller(s), the main rotor being driven in rotation by the power plant on a priority basis. The remaining power delivered by the power plant is power available for independently driving rotation of the propulsive propeller(s).

With reference to FIG. 1, the regulation method of the present invention implements control means 12 that work out control orders 14 relating to at least one setpoint for varying the mean pitch of the blades of the at least one propulsive propeller, indicated in block 16, if not of each of the propulsive propellers when the method is applied to a hybrid helicopter having a plurality of propulsive propellers. On the basis of the pitch variation setpoint, the control means 12 generate the control orders 14 that cause the mean pitch of the blades of the propulsive propeller(s) to vary.

With further reference to FIG. 1, the pitch variation setpoints regulate the propulsion speed of the hybrid helicopter as a function of a piloting order 20 that an operator 22, and in particular human pilot of the hybrid helicopter, generates by means of least one manual control member 24. Such a manual member is a control member 24 that is operated by a human so as to allow the pilot 22 of a hybrid helicopter to order a variation in the thrust delivered by the propulsive propeller, or where appropriate that is delivered by one and/or the other of the propulsive propellers of a hybrid helicopter. The manual control 24 issues a piloting order 20 that is transmitted to the control means 12 in order to generate the corresponding control orders 14. The control means 12 are also suitable for working out the pitch variation setpoint as a function of the power being consumed by the propulsive propeller, or where appropriate by each of the propulsive propellers of the hybrid helicopter.

With reference to FIG. 2, and with further reference to FIG. 1, the regulation method of the present invention comprises various piloting processes 32, including a piloted process 34 and a corrective process 36. In the piloted process 34, control orders 14 corresponding to the pitch setpoint are worked out by the control means 12 on the basis of piloting orders 20 for varying the pitch of said blades, which orders are generated by the manual control member 24. In the corrective process 36, control orders 14 corresponding to the pitch setpoint are worked out by the control means 12 on the basis of corrected piloting orders for varying the pitch of said blades, which corrected piloting orders are generated on the basis of a piloting order 20 corrected by the control means 12 with reference to at least one limiting regulation parameter, as indicated in block 40. The limiting regulation parameter is a predetermined parameter that relates to the known strength capacity of the hybrid helicopter concerning its general operation and/or of the various members with which it is fitted.

DETAILED DESCRIPTION OF THE INVENTION

Figure 1:
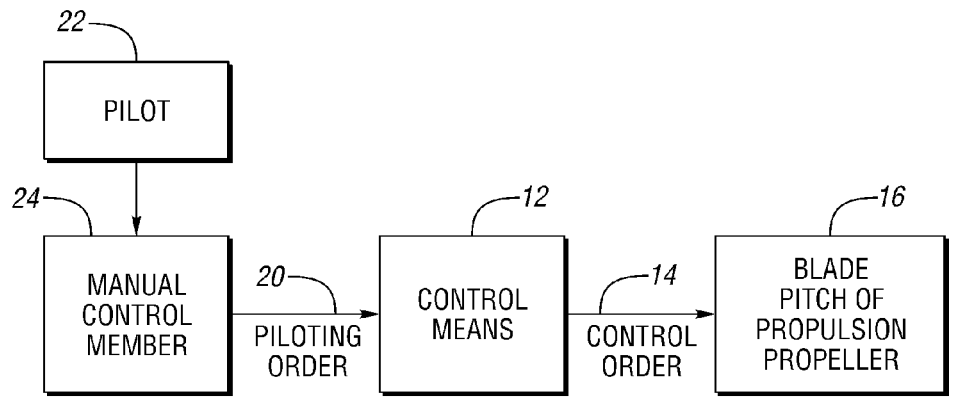
FIG. 1 illustrates a block diagram of a control system for implementing a method of regulating the propulsion speed of a hybrid helicopter in accordance with an embodiment of the present invention.
Figure 2:
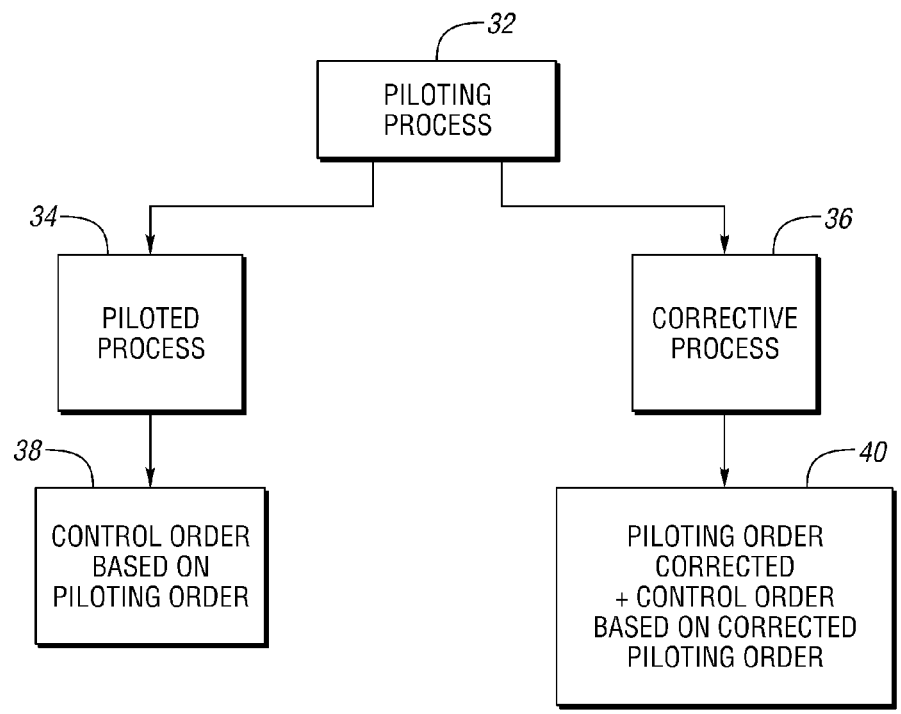
FIG. 2 illustrates a flowchart describing operation of the method of regulating the propulsion speed of a hybrid helicopter.

In one approach of the present invention, the various piloting processes are more specifically to be considered with reference to the respective ways in which the various operating modes of the equipment controlling the propulsive propeller operates. Such modes of operation and control equipment make use of the control means for generating control orders, and include in particular those relating to the rotorcraft control method constituting the subject matter of document FR 2 946 315. More particularly, the piloted process is activated in a said "direct" mode, and the corrected process is activated, when necessary, by the control means in said "direct" mode and in said "regulated" mode in order to protect the hybrid helicopter.

According to the present invention, the regulation method is mainly recognizable in that the piloting orders relate to an airspeed setpoint. The airspeed under consideration may equally well be a true airspeed or an indicated airspeed. The term "true airspeed" is generally used to designate the speed of the helicopter relative to the air, while taking account of the density of the air surrounding the helicopter compared with the density of air at sea level. The term "indicated airspeed" is used to designate the speed of the helicopter as evaluated by an on-board measuring instrument, which speed is corrected for the effects of compressibility under standard atmospheric conditions at sea level.

On the basis of such airspeed setpoints, the corrective process is implemented in at least a first correction mode. In accordance with such a first correction mode, the corrected piloting orders are derived from piloting orders that are corrected in application of a first rule taking account of a setpoint consumed power corresponding to the airspeed setpoint derived from the piloting order.

More particularly, said first rule is based on the following rule, using an airspeed setpoint generated by the manual control member:

$$\beta_{prop} = kp_2(P-P^*) + ki_2\int(P-P^*) \cdot dt$$

According to this first rule, $\beta_{prop}$ corresponds to the mean pitch of the blades of each propulsive propeller, P corresponds to the consumed power, P* corresponds to the setpoint consumed power, and $kp_2$ and $ki_2$ correspond to constant regulation parameters that are predetermined by modeling.

A method is proposed that preferably takes account of various correction modes depending on the power consumed by the propulsive propeller. The corrective process may be implemented in a variety of ways depending on a determination of the power being consumed by the propulsive propeller, these ways being selected depending on whether power consumption is a low power consumption or a high power consumption.

The concepts of low power and high power should be considered as being relative values, where low power is a value that is less than high power. The concepts of low power and high power should be evaluated in particular depending on the forward speed of the rotorcraft and more particularly depending on the flying states of the rotorcraft for which respective power requirements of the rotorcraft are defined.

In this context, such needs can vary and may be defined depending on the particular structure of the rotorcraft, and, where applicable, on the total weight of the rotorcraft including possible payloads, and more particularly depending on the specific capacities of the rotorcraft for developing and consuming power as a function of its needs in a given flight situation, and more particularly relative to said flight states of the rotorcraft and to transient stages between said flight states.

Consideration should be given in particular to various commonly-accepted flight states for a rotorcraft, such as hovering and/or low speed flight states, a cruising flight state, or indeed a transient flight state between said hovering and/or low speed flight states and a said cruising flight state. In a hovering flight state, the forward speed of the rotorcraft may be estimated as being less than about 40 knots (kt), or indeed less than 20 kt; in a low speed flight state, the forward speed of the rotorcraft may be estimated as being less than about 120 kt or less than about 150 kt. In a hovering and/or low-speed flight state, low levels of power should be taken into consideration. In a transient flight state and in a cruising flight state, rotorcraft speeds may be estimated as being greater than 120 kt or than 150 kt, and high consumed powers should be taken into consideration.

In order to illustrate the distinction drawn between the concepts of low powers and of high powers, it has been found by testing that, for a rotorcraft of given structure, there is a separation threshold between the concept of low power and the concept of high power. Such a separation threshold has been evaluated in the context of such testing as lying in the range about 15% to 25% of the power available from the power plant for driving the propulsive propeller, or where appropriate the various propulsive propellers, of a hybrid helicopter. Such an observation derived from testing is given by way of indication.

More particularly, the first correction mode is implemented at high consumed power. At low consumed power the corrective process is implemented on the basis of said airspeed setpoint in accordance with at least one second correction mode in which the corrected piloting orders are derived from piloting orders that are corrected in application of a second rule directly taking account of said airspeed setpoint derived from the piloting order.

More particularly, said second rule is based on the following rule, using an airspeed setpoint generated by the manual control member:

$$\beta_{prop} = kp_1(TAS-TAS^*) + ki_1 \int (TAS-TAS^*) \cdot dt$$

In this second rule, $\beta_{prop}$ corresponds to the mean pitch of the blades of each propulsive propeller, TAS corresponds to the airspeed, TAS* corresponds to the airspeed setpoint, and $kp_1$ and $ki_1$ correspond to constant regulation parameters determined by modeling.

At high consumed power, the corrected piloting orders are generated by the control means on the basis of piloting orders that are corrected in application of a first rule taking account of a setpoint consumed power. The setpoint consumed power is a theoretical consumed power that corresponds to said airspeed setpoint derived from the piloting order, and more particularly indifferently regardless of whether the control means are operating in said direct mode or in said regulated mode.

At low consumed power, the corrected piloting orders are generated by the control means on the basis of piloting orders that are corrected in application of a second rule taking account of the airspeed setpoint derived from the piloting order. The airspeed setpoint is directly usable by the control means, where necessary, for correcting the piloting orders in application of the corrective process and for issuing corresponding control orders.

The manual control member operated by the pilot for regulating the propulsion speed of the hybrid helicopter generates an airspeed setpoint. This airspeed setpoint is used by the control means for generating the corrected control orders that give rise to a variation in the mean pitch of the blades, while ensuring that the operation of the hybrid helicopter is safe.

The ways in which the airspeed setpoint is used by the control means for correcting the piloting orders in application of the corrective process differ depending on the power being consumed by the propulsive propeller, which power is continuously monitored by suitable means of the hybrid helicopter. At low consumed power, the piloting order is corrected by means of a correction that is applied depending on the airspeed setpoint on which the piloting order is based. At high consumed power, the airspeed setpoint on which the piloting order is based is transformed by the control means into a corresponding consumed power setpoint. The corrected piloting orders on the basis of which the control orders are prepared relating to a variation to be applied to the pitch of the blades are themselves generated by the control means on the basis of said transformation. At high consumed power, the piloting order is corrected into a corrected piloting order by a correction that is applied at the consumed power corresponding to the airspeed setpoint on which the piloting order is based. At high power, this correction is prepared by the control means so as to generate the control orders that cause the pitch of the blades of the propulsive propeller to be varied.

Acting in this way by using the airspeed setpoint depending on the monitored power consumption provides satisfactory pilot comfort and ergonomics. The piloting order used in the corrective process is continuously based on an airspeed setpoint. Safe operation of the hybrid helicopter is ensured, with the airspeed setpoint being used by the control means in the corrective process in a manner that is adapted as a function of the consumed power value, which value is continuously monitored. The variation in the pitch of the blades as prepared by the control means is based directly on the airspeed setpoint derived from the piloting order at low consumed power, and on the theoretical consumed power corresponding to the airspeed setpoint derived from the piloting order at high consumed power.

in the event of the setpoint consumed power, that is deduced from the airspeed setpoint generated by the manual control member, tends to reach and/or exceed a predetermined maximum acceptable power value, the setpoint consumed power is limited by the control means while they are deducing the control order relating to the setpoint for varying the pitch of the blades. The maximum acceptable power is predetermined depending on the strength abilities of the hybrid helicopter, and in particular on the strength of the power plant and/or the transmission chain connecting it to the propulsive propeller. Whatever the value of the setpoint consumed power as deduced from the airspeed setpoint generated by the manual control member, beyond the maximum acceptable power threshold, the setpoint consumed power is reduced in order to avoid damaging the hybrid helicopter under the effect of an unsuitable flight control being issued by the pilot.

Any mode of operation implemented by the control means and seeking to maintain the speed of the hybrid helicopter is incapable of giving rise to a variation in the pitch of the blades of the propulsive propeller beyond the threshold that is determined by the maximum power that is acceptable given the strength abilities of the hybrid helicopter.

In certain variants, the manual control member may be implanted on a control stick or a control desk of the rotorcraft.

In a variant, the manual control member is installed on a stick for controlling variation in the cyclic pitch of the blades of a rotary wing constituted by the main rotor of the hybrid helicopter. Such a control member is advantageously movable in multiple directions, being arranged as a "coolie hat", as a slider, or as any other analogous control member.

In a preferred embodiment, the manual control member is of the known type commonly referred to by the person skilled in the art as a "beep trim" button, being arranged as a "coolie hat" switch or as an analogous manual control member. A "beep trim" is a manual control member advantageously suitable for being installed on a stick for controlling variation in the cyclic pitch of the blades of a rotary wing constituted by the main rotor of the hybrid helicopter.

In another variant, the manual control member is installed in a desk forming part of an instrument panel of a hybrid helicopter. Such a control member may for example be associated with a rotary knob.

It is appropriate to take account of the drag coefficient of the airframe of the hybrid helicopter, which coefficient may optionally be corrected for any traction produced by the main rotor. Such traction may be positive with a propulsive main rotor or negative with an autogyro in which the function of the main rotor is restricted to providing lift.

The setpoint consumed power is preferably corrected for static error, taking account of the drag coefficient of the airframe of the hybrid helicopter and considering any traction produced by the main rotor as being neutral. Where appropriate, it is possible to envisage modulating the value of the maximum acceptable power as a function of additional parameters, e.g. taking account of any traction that might be provided by the main rotor.

More particularly, the setpoint consumed power corresponding to the control order based on the airspeed setpoint is previously defined in application of a third rule. According to this third rule, a theoretical consumed power is determined and is corrected for static error by a rule that takes account at least of the drag coefficient of the airframe of the hybrid helicopter.

The third rule is based in particular on the following rule:

$$P^* = \tfrac{1}{2}\rho TAS^{*3} CxS/\eta + kp'(TAS - TAS^*) + ki'\!\int(TAS - TAS^*)\cdot dt$$

in which rule:

$\rho$ is the density of the air;

CxS is the drag coefficient of the airframe of the hybrid helicopter, which, where appropriate, is preferably corrected by the traction induced by the main rotor, e.g. in the form of a fixed contribution; and $\eta$ is the efficiency of the propulsive propeller.

The power consumed is evaluated continuously regardless of the operating mode of the control means, and consequently regardless of which process is in use. The consumed power may for example be determined on the basis of measurement means installed on the propulsive propeller, and/or by means of an estimation calculator. On the basis of said piloting orders relating to a said airspeed setpoint, such an estimation calculator may take account equally well of information relating respectively to the pitch of the blades of the propulsive propeller, to the airspeed, to the speed of rotation of the propulsive propeller, and/or to the density of the air.

The method of the present invention is implemented in particular in the context of a flight control procedure comprising various said modes of operation for using the propulsive propeller, and more particularly a procedure for controlling variation of the mean pitch of its blades. Such a flight control procedure corresponds in particular to the flight control procedure constituting the subject matter of document FR 2 946 315.

More particularly, the mean pitch setpoint for the blades of the propulsive propeller is generated selectively in the piloted process or the corrective process in accordance with the various following modes of operation:

a direct mode, in which the control order relating to the value of the mean pitch to be induced for the blades of the propulsive propeller is derived directly from the piloting order generated by the manual control member. The piloted process and the corrective process are activated selectively in direct mode as required, in particular depending on whether or not a said protected mode is activated;

a forced mode implemented in the event of the main rotor auto-rotating, in which the control order relating to the value to be induced for the mean pitch of the blades of the propulsive propeller is forced to a pitch value that is calculated by the control means. The forced mode is activated on the basis of a piloting order relating to a forced mode setpoint that is generated by the pilot by means of the manual control member;

a regulated mode in which the control order relating to the value of the mean pitch to be induced for the blades of the propulsive propeller is determined on the basis of regulating the power being consumed in application of a thrust variation setpoint that is generated by the control means. The corrective process is activated optionally, depending on requirements, in particular depending on whether or not a said protected mode seeking to protect the hybrid helicopter is actuated; and a protected mode in which the control order relating to the value of the mean pitch to be induced for the blades of the propulsive propeller is derived from implementing either the direct mode or the regulated mode. In protected mode, the order controlling the value of the mean pitch of the blades of the propulsive propeller is corrected by the control means in compliance with the corrective process with respect to at least one limiting regulation parameter that relates to the strength capacity of the hybrid helicopter.

For each of the various operating modes other than forced mode, a piloting order relates to an airspeed setpoint. The piloting order:

is either used directly by the control means in direct mode in order to generate the control orders;

or, at low consumed power, is corrected directly by the control means in order to generate control orders taking account of the strength abilities of the hybrid helicopter;

or else, at high consumed power, is transformed by the control means into a corresponding theoretical setpoint consumed power corresponding to the airspeed setpoint. The consumed power setpoint is calculated by the control means and is used by the control means for generating the control orders while taking account of the strength abilities of the hybrid helicopter.

Whatever the operating mode of the control equipment that is implemented and whatever the airspeed setpoint that is generated, the setpoint consumed power cannot exceed the maximum acceptable power.

The control method of the present invention is implemented in particular in the context of the protected mode. The provisions and the means described by document FR 2 946 315 relating to implementing various modes of operating the flight control method are applied by transposition in the context of the control method of the present invention. Piloting comfort and ergonomics are improved, while satisfying safety conditions concerning the strength of the hybrid helicopter.

In a preferred implementation of the method of the present invention, the ergonomics of flight control equipment for the propulsive propeller of a hybrid helicopter are improved by display means that are associated with the control means.

More particularly, the setpoint consumed power generates a signal for activating a progressive visual indicator member. Such an indicator member displays to the pilot of the hybrid helicopter the setpoint consumed power as deduced by the control means and that corresponds to the piloting order derived from the pilot operating the manual control member.

Such a member for indicating the setpoint consumed power is preferably associated with an analog member for indicating the airspeed setpoint as generated by the pilot operating the manual control member. The pilot thus has a visual indication of the setpoint consumed power determined on the basis of the airspeed setpoint as generated by operating the manual control member, in parallel with a visual indication of the airspeed setpoint.

At least the member for indicating the consumed power, and possibly also the member for indicating the airspeed, may be incorporated in the manual control member, which may be a manual control member arranged as a "coolie hat" button or as a "beep trim" button.

In another implementation, at least the member for indicating the consumed power, and possibly also the member for indicating the airspeed, may be formed using a display member that is structurally independent, in particular when the manual control member is arranged as a "beep trim" button.

The member for indicating the setpoint consumed power and/or the analog member for indicating the airspeed setpoint are preferably each constituted by a marker including a visual value-variation scale, the marker advantageously being green in color when the airspeed-maintaining mode is engaged.

What is claimed is:

1. A method of regulating the propulsion speed of a hybrid helicopter having at least one main lift rotor and at least one propulsive propeller provided with a set of variable-pitch blades, the main rotor and the propulsive propeller being driven in rotation by at least one power plant of the hybrid helicopter;

said method of regulating implementing control means that work out control orders relating to at least one mean pitch setpoint for the blades of the propulsive propeller as a function of a piloting order generated by an operator by means of at least one manual control member and as a function of the power being consumed by the propulsive propeller; and said regulating method comprising various piloting processes, including:

a piloted process whereby the piloting orders for varying the pitch of said blades are generated by the manual control member; and a corrective process whereby corrected piloting orders for varying the pitch of said blades are generated on the basis of a piloting order that is corrected with reference to at least one limiting regulation parameter that relates to the strength capacity of the hybrid helicopter;

wherein:

the piloting orders relate to an airspeed setpoint; and the corrective process is implemented on the basis of said airspeed setpoints in accordance with at least one first correction mode in which the corrected piloting orders are derived from piloting orders that are corrected in application of a first rule taking account of a setpoint consumed power corresponding to the airspeed setpoint derived from the piloting order.

2. A method according to claim 1, wherein said first rule is based on the following rule:

$$\beta_{prop}=kp_2(P-P^*)+ki_2\int(P-P^*)\cdot dt$$

in which rule, $\beta_{prop}$ corresponds to the mean pitch of the blades of each propulsive propeller, P corresponds to the consumed power, P* corresponds to the setpoint consumed power and $kp_2$ and $ki_2$ correspond to constant regulation parameters that are predetermined by modeling.

3. A method according to claim 1, wherein:

the first correction mode is implemented at high consumed power; and at low consumed power the corrective process is implemented on the basis of said airspeed setpoint in accordance with at least one second correction mode in which the corrected piloting orders are derived from piloting orders that are corrected in application of a second rule taking account of said airspeed setpoint derived from the piloting order.

4. A method according to claim 3, wherein said second rule is based on the following rule:

$$\beta_{prop}=kp_1(TAS-TAS^*)+ki_1\int(TAS-TAS^*)\cdot dt$$

in which second rule, $\beta_{prop}$ corresponds to the mean pitch of the blades of each propulsive propeller, TAS corresponds to the airspeed, TAS* corresponds to the airspeed setpoint, and $kp_1$ and $ki_1$ correspond to constant regulation parameters determined by modeling.

5. A method according to claim 1, wherein the setpoint consumed power is previously defined in application of a third rule in which a theoretical consumed power is determined and is corrected for static error by a rule that takes account of the drag coefficient of the airframe of the hybrid helicopter.

6. A method according to claim 5, wherein the drag coefficient of the airframe of the hybrid helicopter is corrected for the traction induced by the main rotor.

7. A method according to claim 5, wherein the third rule is based on the following rule:

$$P^*=\tfrac{1}{2}\rho TAS^{*3}CxS/\eta+kp'(TAS-TAS^*)+ki'\int(TAS-TAS^*)\cdot dt$$

in which rule, $\rho$ is the density of the air, CxS is the drag coefficient of the airframe of the hybrid helicopter, and $\eta$ is the efficiency of each propulsive propeller.

8. A method according to claim 1, wherein the power being consumed is determined on the basis of measurement means installed on the propulsive propeller.

9. A method according to claim 1, wherein the power being consumed is determined by an estimation calculator on the basis of said piloting orders relating to a said airspeed setpoint, at a function equally well of information relating respectively to the pitch of the blades of the propulsive propeller, to the airspeed, to the speed of rotation of the propulsive propeller, and to the density of the air.

10. A method according to claim 1, wherein the mean pitch setpoint for the blades of the propulsive propeller is generated selectively in the piloted process or the corrective process in accordance with the various following modes of operation:

a direct mode, in which the control order relating to the value of the mean pitch to be induced for the blades of the propulsive propeller is derived directly from the piloting order generated by the manual control member;

a forced mode implemented in the event of the main rotor auto-rotating, in which the control order relating to the value to be induced for the mean pitch of the blades of the propulsive propeller is forced to a pitch value that is calculated by the control means on the basis of a piloting order relating to a forced mode setpoint that is generated by the pilot by means of the manual control member;

a regulated mode in which the control order relating to the value for the mean pitch of the blades of the propulsive propeller is determined on the basis of regulating the power being consumed in application of a thrust variation setpoint that is generated by the control means; and a protected mode in which the control order relating to the value for the mean pitch of the blades of the propulsive propeller is derived from implementing either the direct mode or the regulated mode, while being corrected by the control means in compliance with the corrective process with respect to at least one limiting regulation parameter that relates to the strength capacity of the hybrid helicopter.

11. A method according to claim 10, wherein for each of the various operating modes other than the force mode, a piloting order relates to an airspeed setpoint, said piloting order:

either being used directly by the control means in direct mode in order to generate the control orders;

or, at low consumed power, being corrected directly by the control means in order to generate control orders taking account of the strength abilities of the hybrid helicopter;

or else, at high consumed power, being transformed by the control means into a corresponding theoretical setpoint consumed power that is used by the control means for generating the control orders while taking account of the strength abilities of the hybrid helicopter.

12. A method according to claim 1, wherein the setpoint consumed power generates a signal for activating a progressive visual indicator member that displays the setpoint consumed power corresponding to the piloting order derived from the operating of the manual control member.

13. A method according to claim 12, wherein the member for indicating the setpoint consumed power is associated with a member for indicating the airspeed setpoint generated from the operating of the manual control member.

* * * * *